Aug. 28, 1956 J. G. LINDEMAN 2,760,423
COIL SPRING CULTIVATOR SHANK AND CLAMP
Filed April 22, 1952
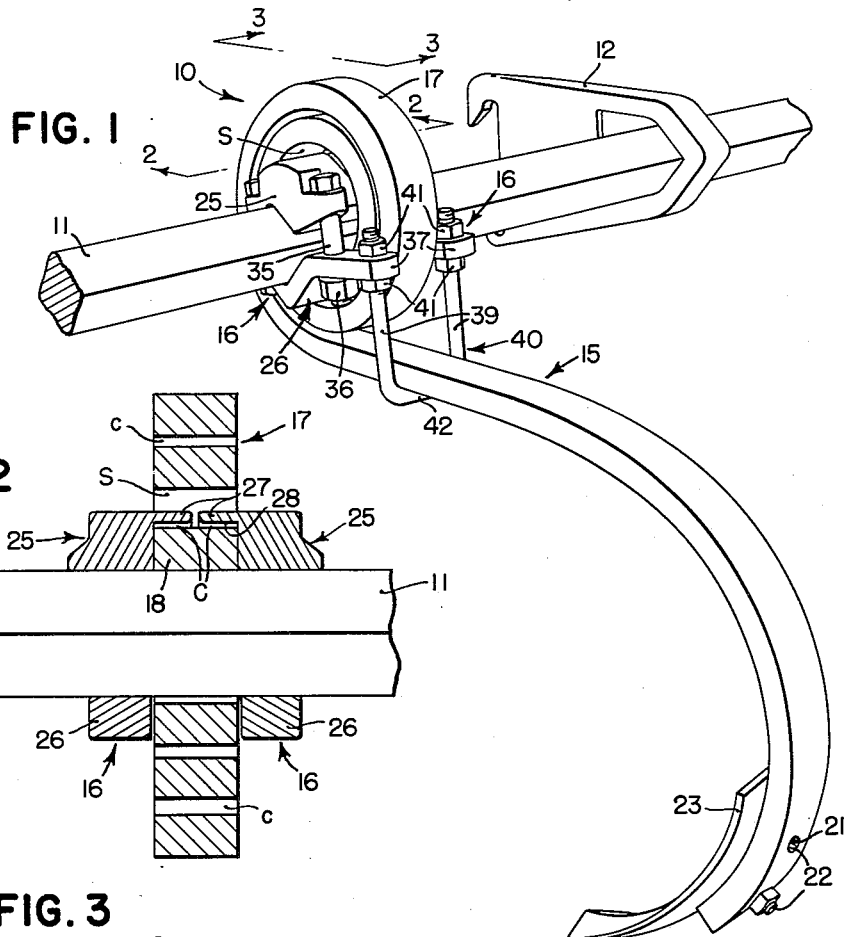
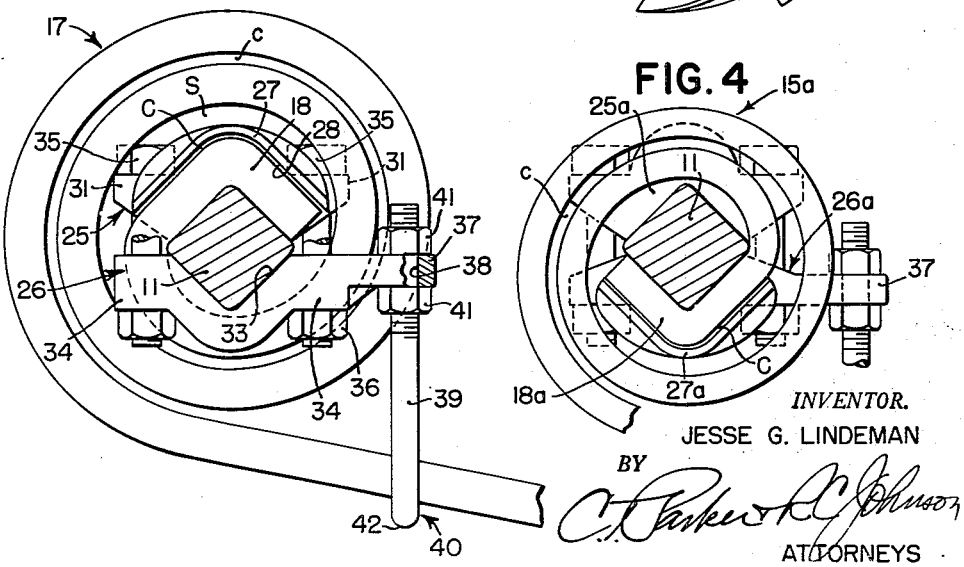
INVENTOR.
JESSE G. LINDEMAN
BY
ATTORNEYS

United States Patent Office 2,760,423
Patented Aug. 28, 1956

2,760,423

COIL SPRING CULTIVATOR SHANK AND CLAMP

Jesse G. Lindeman, Yakima, Wash., assignor to Deere & Company, Moline, Ill., a corporation of Illinois Application April 22, 1952, Serial No. 283,706

9 Claims. (Cl. 97—198.1)

The present invention relates generally to agricultural machines and more particularly to tool bar implements, wherein a generally transversely arranged, relatively heavy tool bar receives one or more of a number of different kinds of ground-working tools or the like. More particularly, the present invention relates to spring teeth and means for fastening them to a tool bar or the like.

The object and general nature of the present invention is the provision of a new and improved harrow tooth construction. More particularly, it is a feature of this invention to provide means for fastening each of a plurality of harrow teeth or the like to a tool bar so that the working ends of the teeth can be brought into alignment each with respect to the others.

It is also a feature of this invention to provide new and improved means for clamping the coiled end of a spring tooth or the like to a transverse tool bar about which the coiled end is disposed.

These and other objects and advantages of the present invention will be apparent to those skilled in the art after a consideration of the following detailed description, taken in conjunction with the accompanying drawings, in which:

Figure 1 is a perspective view of a tool bar and a harrow tooth construction adapted to be fixed to the tool bar and incorporating the principles of the present invention.

Figure 2 is a sectional view taken generally along the line 2—2 of Figure 1.

Figure 3 is a sectional view taken generally along the line 3—3 of Figure 1.

Figure 4 is a view similar to Figure 3, showing a modified form of this invention.

The harrow tooth construction of the present invention, indicated in its entirety by the reference numeral 10, is shown as mounted on a square tool bar 11 which may form a part of a tool carrier to which a plurality of tools, or one or more of a number of other tools, may be attached. For the purpose of illustrating the principles of the present invention, the tool bar 11 is shown as equipped with a pair of brackets 12 by which the bar may be connected to a propelling agency, such as a tractor or the like. So far as the principles of the present invention are concerned, the tool bar 11 may form a part of a wheeled frame or other suitable propelling agency.

The tooth construction 10 includes a tool-carrying coil spring tooth or shank member 15 and a pair of clamps 16 adapted to be fixedly secured to the tool bar 11 for connecting the coiled end portion 17 of the tooth member 15 to the tool bar. The coiled portion 17 of the tooth shank 15 lies at one end thereof and is adapted to completely encircle the tool bar 11 with a clearance c between the two or more turns of the coiled portion 17. The inner end of the coiled portion 17 is shaped, as shown at 18, to snugly fit two adjacent sides of the tool bar 11, which preferably is square in cross section and arranged as shown in Figure 3. The other end of the tooth or shank member 15 extends rearwardly and is curved downwardly, being apertured, as at 21, to receive bolts 22 or the like by which a ground-working tool 23 is secured to the lower end of the member 15.

The two clamps 16 are substantially identical, and hence a description of one will suffice for a complete disclosure of both. The two clamps 16 are adapted to be fixed to the tool bar 11 closely adjacent opposite sides of the coiled portion 17 of the shank member 15.

Each clamp 16 comprises a generally V-shaped clamp member 25 and a companion generally V-shaped clamp cap member 26. The clamp member 25 is provided at one side thereof with an extension 27 that is directed axially inwardly and is dimensioned so as to be adapted to lie in the space S between the angled inner end 18 of the coiled portion 17 and the adjacent outer turn. The inner face 28 of the extension 27 is adapted to engage the V-shaped end 18 of the spring tooth coiled portion 17 for holding the tooth or shank member 15 on the bar 11, as will be explained in more detail below. The clamp member 25 carries apertured ears 31.

The cap member 26 of each clamp 16 includes a generally V-shaped socket section 33 and a pair of apertured ears 34, the apertures in which are adapted to be aligned with the apertures in the ears 31 of the member 25. Clamping bolts 35 are passed through the apertured ears 31 and 34 and carry nuts 36 which, when tightened, firmly clamp the two members 25 and 26 to the tool bar in fixed relation, with the lateral extension 27 lying in the space S and holding the end 18 of the coil 17 substantially against the tool bar 11. The cap member 26 carries an extension 37 that is apertured, as at 38, to receive one leg 39 of a U-bolt 40. Each leg 39 of the U-bolt 40 carries a pair of lock nuts 41 by which the U-bolt may be firmly fixed to the extensions 37, with the bight portion 42 of the U-bolt 38 lying under the portion of the spring shank 15 just outwardly of the coiled section 17.

The clamp members 25 are so formed that, when the extensions 27 thereof are disposed in the space S, there is a slight clearance C between the inner face 28 of the extension 27 and the adjacent side of the V-shaped end 18. This is for the purpose of taking care of manufacturing tolerances so that variations in the shape and/or size of the end 18 will not prevent the tightening of the clamping nuts 36 from firmly securing the clamp members to the tool bar 11. At the same time, the extension 27 fits with sufficient snugness against the spring end 18 that the latter is held against turning relative to the bar 11 so that when the U-bolt 39 is adjusted, as by loosening one set of nuts 41 and tightening the other, the tool 23 at the end of the shank member 15 is brought to the desired position, which preferably is in transverse alignment with all of the companion tools.

In the form of the invention described above the coil end 17 of the shank 15 is so formed that the angled portion 18 is adapted to lie on top of the tool bar 11, as best shown in Figure 3. Where the spring shank is of slightly smaller dimensions, such as thickness, for example, the required resiliency may be obtained with a smaller number of turns than that shown in Figures 1–3, and in certain cases, therefore, the spring shank, shown at 15a in Figure 4, may have its angled tool bar engaging portion 18a disposed to engage the lower side of the tool bar 11. In that event, the clamp member 25a is formed substantially like that shown in Figures 1–3 except that the extension 27 is omitted. Instead, an extension, as at 27a, is formed on the lower cap member 26a, rather than on the upper clamp member 25a. Otherwise, the construction and arrangement of the clamp members 25a and 26a is substantially the same as that shown in Figures 1–3.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. A harrow tooth construction for a polygonal tool bar adapted to receive a ground-working tooth, said tooth construction comprising a spring tooth coiled at one end to loosely encircle said tool bar, said one end of said spring tooth being shaped to non-rotatably engage a polygonal portion of said tool bar, the turns of said coiled portion being spaced apart and the inner end of said coiled portion forming clamp-receiving means, and a pair of clamps adapted to be disposed about said tool bar, one at each side of said coiled portion, and each having means extending laterally inwardly into engagement with said clamp-receiving means for holding said end of said spring tooth against said tool bar in non-rotatable relation.

2. A harrow tooth construction for a polygonal tool bar adapted to receive a ground-working tooth, said tooth construction comprising a spring tooth coiled at one end to loosely encircle said tool bar, the inner end of the coiled portion forming a clamp-receiving means and shaped to non-rotatably engage a non-circular portion of said tool bar, and clamp means adapted to be mounted fixedly on said tool bar and including a pair of clamping parts, one disposed at each side of said coiled spring tooth portion, each of said clamping parts having a laterally extending portion adapted to enter the coiled portion of said spring tooth and engage the clamp-receiving means of said coiled portion and hold the same snugly against said tool bar.

3. A harrow tooth construction for a tool bar adapted to receive a ground-working tooth, said tooth construction comprising a spring tooth coiled at one end to loosely encircle, at least partially, said tool bar, the inner end of the coiled portion forming clamp-receiving means, and a pair of clamps adapted to be disposed on said tool bar at opposite sides of the coiled portion of said spring tooth, each clamp including a clamp member, an associated cap member, and means for securing said members tightly to said tool bar, one of said members of each clamp including an outwardly directed extension, and one of said members of each clamp including a laterally inwardly extending coil-engaging portion, and adjustable means acting between said extensions and the spring tooth beyond the coiled portion thereof for positioning the other end of said tooth.

4. A harrow tooth construction as defined in claim 3, further characterized by the inner end of said coiled portion being generally V-shaped, and each of said coil-engaging portions being V-shaped so as to engage the V-shaped end of the associated spring tooth coiled portion.

5. A harrow tooth construction as set forth in claim 3, further characterized by one member of each clamp carrying the associated coil-engaging portion and the other member of said pair carrying the associated outwardly directed extension.

6. A harrow tooth construction as defined in claim 3, further characterized by each of said clamp members carrying the associated coil-engaging portion and the cap member carrying the associated outwardly directed extension.

7. A harrow tooth construction as set forth in claim 3, further characterized by each of said cap members carrying the associated outwardly directed extension.

8. A harrow tooth construction as defined in claim 7, further characterized by each of said cap members also carrying the associated coil-engaging portion.

9. A harrow tooth construction for a non-circular tool bar adapted to receive a plurality of ground-working teeth, said tooth construction comprising a spring tooth coiled at one end to loosely encircle said tool bar and having a non-circular portion shaped complementarily to snugly engage the non-circular portion of said tool bar, and clamp means adapted to be mounted fixedly on said tool bar and including a part disposed at each side of the non-circular portion of said spring tooth, at least one of said parts having means extending laterally inwardly and adapted to enter the coiled portion of said spring tooth into engagement with said non-circular portion of said spring tooth for holding said tooth portion against said non-circular portion of said tool bar.

References Cited in the file of this patent
UNITED STATES PATENTS

| | | |
|---|---|---|
| 283,324 | Carr | Aug. 14, 1883 |
| 756,995 | Vance | Apr. 12, 1904 |
| 1,366,557 | Cady | Jan. 25, 1921 |
| 1,914,731 | Stewart | June 20, 1933 |
| 1,950,834 | Wyss | Mar. 13, 1934 |
| 2,259,890 | Hipple | Oct. 21, 1941 |
| 2,385,950 | Silver | Oct. 2, 1945 |